United States Patent
Carrico

(10) Patent No.: US 7,668,628 B1
(45) Date of Patent: Feb. 23, 2010

(54) DETECTING AND ALERTING BEFORE AN AIRCRAFT LEAVES AN APPROVED OR SAFE REGION OF OPERATION

(75) Inventor: Matthew J. Carrico, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 455 days.

(21) Appl. No.: 11/230,246

(22) Filed: Sep. 19, 2005

(51) Int. Cl.
*G01C 23/00* (2006.01)
*G05D 1/00* (2006.01)

(52) U.S. Cl. .............................. 701/9; 342/29; 340/961; 340/963; 701/3; 701/8

(58) Field of Classification Search ...................... 701/1, 701/3, 8–10, 300–302; 340/945, 951, 963–964, 340/961; 342/455, 29
See application file for complete search history.

(56) References Cited

U.S. PATENT DOCUMENTS 6,675,095 B1 * 1/2004 Bird et al. .................... 701/301

* cited by examiner

*Primary Examiner*—Yonel Beaulieu
(74) *Attorney, Agent, or Firm*—Daniel M. Barbieri

(57) ABSTRACT

Methods and systems are provided which warn a pilot or flight crew to prevent navigation of an aircraft into an unapproved region of operation. A boundary of an approved region of operation for the aircraft is identified. A position of the aircraft relative to the boundary of the approved region of operation is determined. Then, a warning is generated if the determined position of the aircraft relative to the boundary of the approved region of operation satisfies a predetermined criteria.

14 Claims, 7 Drawing Sheets

DETECTING AND ALERTING BEFORE AN AIRCRAFT LEAVES AN APPROVED OR SAFE REGION OF OPERATION

BACKGROUND

Disclosed embodiments relate generally to aviation electronics (avionics). More particularly, disclosed embodiments relate to terrain awareness systems and methods.

Preventing an aircraft from operating in an unsafe region is important in the aviation industry. It is also important to prevent aircraft from operating in unapproved regions. Several types of terrain awareness systems have been employed to help achieve this goal. Two primary examples of these types of systems include a ground proximity warning system (GPWS) and an enhanced ground proximity warning system (EGPWS). An EGPWS is sometimes also referred to as a terrain awareness warning system (TAWS).

One type of GPWS is frequently used in regions of operation which are near airports. This type of GPWS utilizes on-board sensing of where the aircraft is relative to airport landing sensors. Generally, this type of GPWS does best when the terrain near an airport is relatively flat. EGPWS or TAWS use terrain data bases and aircraft state information to alert the flight crew when an unsafe situation, with respect to terrain and obstacles, is detected. These systems may also provide terrain situation awareness when no unsafe terrain or obstacle situation exists.

These conventional systems do an admirable job of avoiding controlled flight into terrain (CFIT) situations, providing the flight crew with audible and/or visible warnings when such a dangerous situation occurs or is imminent. However, there are several limitations to these types of systems. For example, these systems are dependent upon the availability and validity of the terrain and obstacle database. With the possibility of large buildings being constructed but not updated in terrain map databases, as well as the possibility of other unmapped or mis-mapped terrain or obstacles, the validity of such terrain map databases can be less than completely certain. Also, once obtained, convincing regulatory authorities of their trustworthiness presents additional challenges. Further, as the terrain map databases contain more and more information, the memory requirements for storing and processing the databases have increased significantly. Increases in memory requirements can be costly in avionics applications.

Another limitation of existing terrain awareness systems is the limited amount of time which they allow for a flight crew to react to a detected threat. Frequently, such systems provide the flight crew with a warning approximately one minute or less prior to impact of the aircraft with the terrain or obstacle, though in some situations the warning may be more than a minute in advance. While this may be sufficient time to avoid the CFIT situation, it is not in all cases. Further, the maneuvers required to avoid the terrain or obstacle, given such a limited amount of time to react, may not be ideal for certain flight situations, such as commercial airline flights with passengers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of warning a pilot to prevent navigation of an aircraft into an unapproved region of operation are provided, as are navigation warning systems configured to implement the methods. The navigation warning systems can be used to perform terrain awareness/warning functions to prevent controlled flight into terrain (CFIT). In the systems and methods, a boundary of an approved region of operation for the aircraft is identified. A warning is then generated if a determined position of the aircraft relative to the boundary of the approved region of operation satisfies a predetermined criteria.

DETAILED DESCRIPTION

As noted above, conventional terrain awareness systems use a terrain database and aircraft state information to alert the flight crew when an unsafe situation with respect to terrain and obstacles is detected. As is also noted, these systems can suffer from limitations relating to the availability and validity of the terrain and obstacle database. They can also suffer from limitations related to the amount of time, to react to a detected threat, which such systems provide to the flight crew. Disclosed embodiments of navigation warning systems or terrain awareness systems, as well as methods implemented by the systems for purposes of warning a pilot or flight crew, utilize a different approach to the problem of controlled flight into terrain (CFIT). In the disclosed embodiments, rather than alerting the flight crew when a threat is detected, the systems and methods alert the flight crew when the aircraft is predicted to depart from a pre-determined safe region of operation.

The predetermined safe region of operation is an approved region of operation. The boundary between the approved region of operation and an unapproved region of operation will not typically also be a boundary of an unsafe (due to terrain or obstacles) region of operation, but rather, the unapproved region of operation may contain a terrain hazard or obstacle-creating an unsafe region of operation which is contained in the unapproved region of operation, but spaced apart from the boundary with the approved region of operation. This provides earlier warning of potential hazards, while potentially reducing implementation costs or complexity since detailed terrain databases may not be required. As will be described in further detail below, the predetermined approved region of operation can be defined using multiple techniques, methods or algorithms, for example depending upon flight phase and/or operator procedures of the aircraft. For example, the en route approved operating region can be determined by a minimum clearance altitude defined for a particular route or geographic region. As another example, in the terminal area, the approved operating region can be determined using published minimum descent sectors, published approach/departure route minima, and/or a Terminal Instrument Procedures (TERPS).

Figure 1:
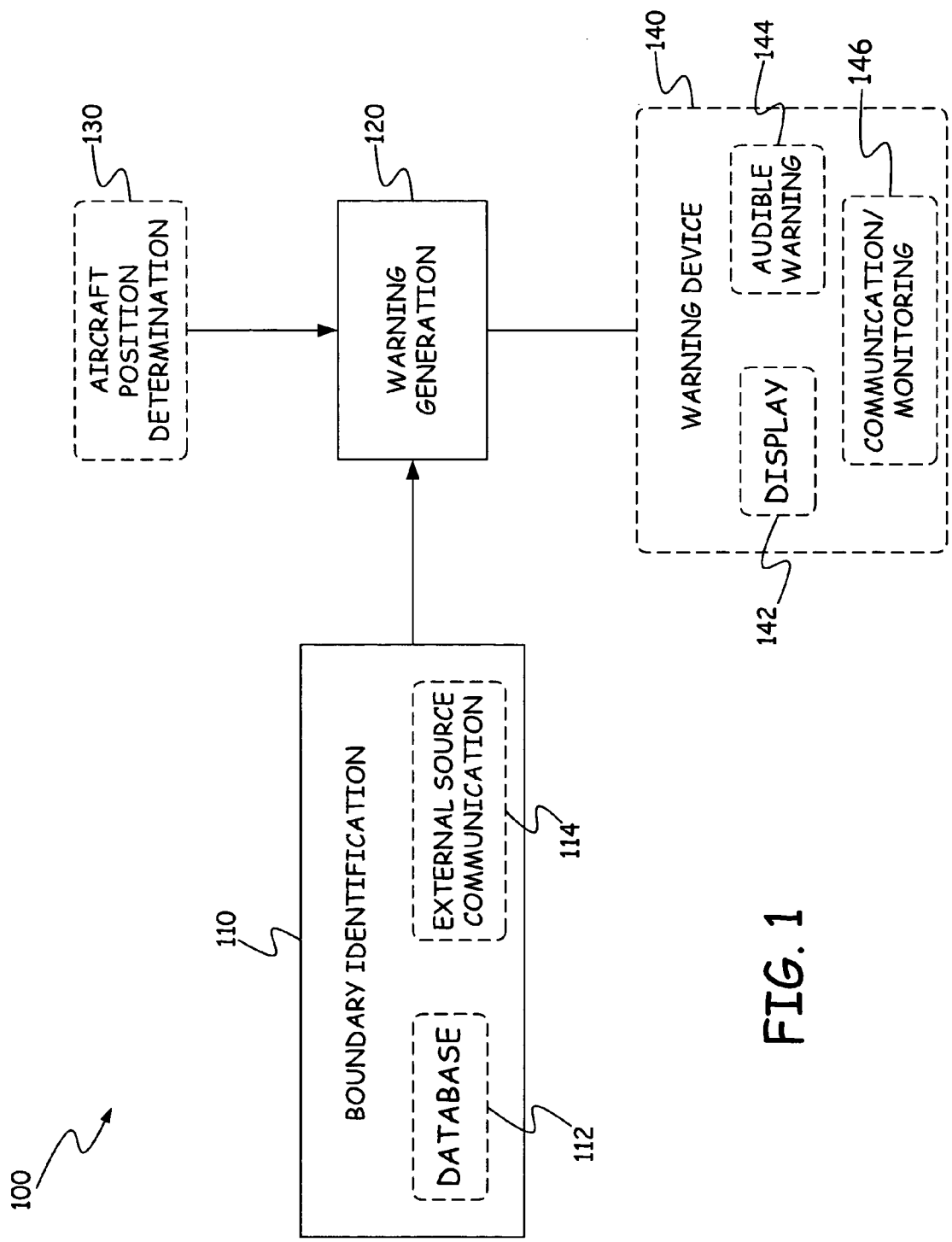
FIG. 1 is a block diagram illustrating an embodiment of a navigation warning system.

FIG. 1 is a block diagram which diagrammatically illustrates a navigation warning system 100 which can be used in an aircraft in accordance with example embodiments. The navigation warning system 100 can be a terrain awareness system, or it can be other systems used to warn a pilot or flight crew if it is predicted that the aircraft will leave an approved region of operation for that aircraft. In addition to providing awareness of terrain or obstacles in order to prevent CFIT situations, such a system can be used to help a pilot maintain a course within some predefined laterally extending region around a path between a departure airport and a destination airport, or to inform a monitoring computer, system, company or person of such deviation from the approved region of operation. Other uses for such a system include providing feedback to a pilot or flight crew in on-ground areas (runways, taxiways, gate areas, etc.) in proximity to an airport. Thus, system 100 can warn a flight crew not to maneuver the aircraft onto unapproved runways, access roads or other prohibited airport areas.

As shown in FIG. 1, navigation system 100, which can be installed in whole or in part on an aircraft, includes boundary identification component 110 and warning generation component 120. Boundary identification component 110 includes one or more systems, modules, circuitry or other devices which are configured to identify a boundary of an approved region of operation for the aircraft. Warning generation component 120 includes one or more systems, modules, circuitry or other devices which are configured to warn a pilot or flight crew of the aircraft if a position and/or a heading of the aircraft satisfies a predetermined criteria relative to the boundary of the approved region of operation. For example, the predetermined criteria can be a prediction that the current position and heading of the aircraft will result in it crossing the identified boundary and departing the approved region within some specified or predetermined amount of time. In other embodiments, the predetermined criteria can be that the aircraft is currently crossing the identified boundary of the approved region. Other aircraft state information can also be used. Warning generation component 120 can also be configured to control a display device to graphically represent the boundary relative to the aircraft position, providing a visual warning even prior to the criteria being met. Components such as boundary identification component 110 and warning generation component 120 can be, in exemplary embodiments, suitably programmed processing circuitry of an avionics system. Also, in some embodiments, each of components 110 and 120 can be implemented within the same processing circuitry, suitably programmed or configured to implement these functions.

In some embodiments, the approved region of operation can be defined on a regional basis using an altitude based criteria that can be modified or adapted to meet aircraft capabilities and operator preferences. The approved operating region can be stored in a database 112, which is optionally included in or associated with boundary identification component 110 as represented using dashed lines. It must be noted that database 112 storing approved operating regions (and thus boundaries) will typically require far less memory and verification than a detailed terrain map database of the type conventionally used in terrain awareness systems. In addition or in the alternative, the approved operating regions can be provided by an external source using a data link or other communications circuitry. This is represented in FIG. 1 as optional external source communication 114.

As noted above, boundary identification component 110 is, in some embodiments, configured to identify the boundary of the approved region of operation using one or more of multiple algorithms or methods, selected based upon one or both of flight phase and operator procedure. Other selection criteria can also be used. Some of these algorithms include determining the boundary using a minimum clearance altitude defined for a particular route or geographic region, using published minimum descent sectors, using published approach/departure route minima, and/or using TERPS. Other algorithms can also be used.

Using an algorithm selected for the particular flight phase, aircraft, operator preferences, etc., boundary identification component 110 identifies the boundary of the approved region of operation. Warning generation component 120 then monitors the position and trajectory of the aircraft relative to the identified boundary to determine if one or both of the position and heading satisfy a predetermined criteria relative to the boundary. As noted, the predetermined criteria can include crossing the boundary, being predicted to cross the boundary within a specific period of time, etc. Typically, aircraft position (and heading if desired) are obtained from other avionics systems, but can be included in system 100 if desired. This optional aspect of aircraft position (and heading) determination 130 is therefore represented as a component in dashed lines in FIG. 1.

Also illustrated in FIG. 1 is warning device 140, which can be included in system 100 in some embodiments, and simply accessed by system 100 in other embodiments. Typically, warning device 140 will include a display device 142 for providing a graphical designation or representation of the boundary of the approved region of operation. The pilot can then visually monitor the aircraft position relative to the boundary in some embodiments. Examples of some such graphical representations are provided in FIGS. 3-7 and are discussed below. Display device 142 can also provide a graphical warning indication, such as flashing display features or other graphical illustrations, if the predetermined criteria relative to the boundary is satisfied. In some embodiments, an audible warning device 144 is provided to audibly warn the pilot or flight crew of the condition relative to the boundary. In yet other embodiments, communication or monitoring components 146 can be included or used to notify a monitoring computer, system, company, person, etc. if the aircraft crosses the boundary into unapproved regions of operation. This can be useful, for example, for companies monitoring the location of flights carrying employees, cargo, etc.

Figure 2:
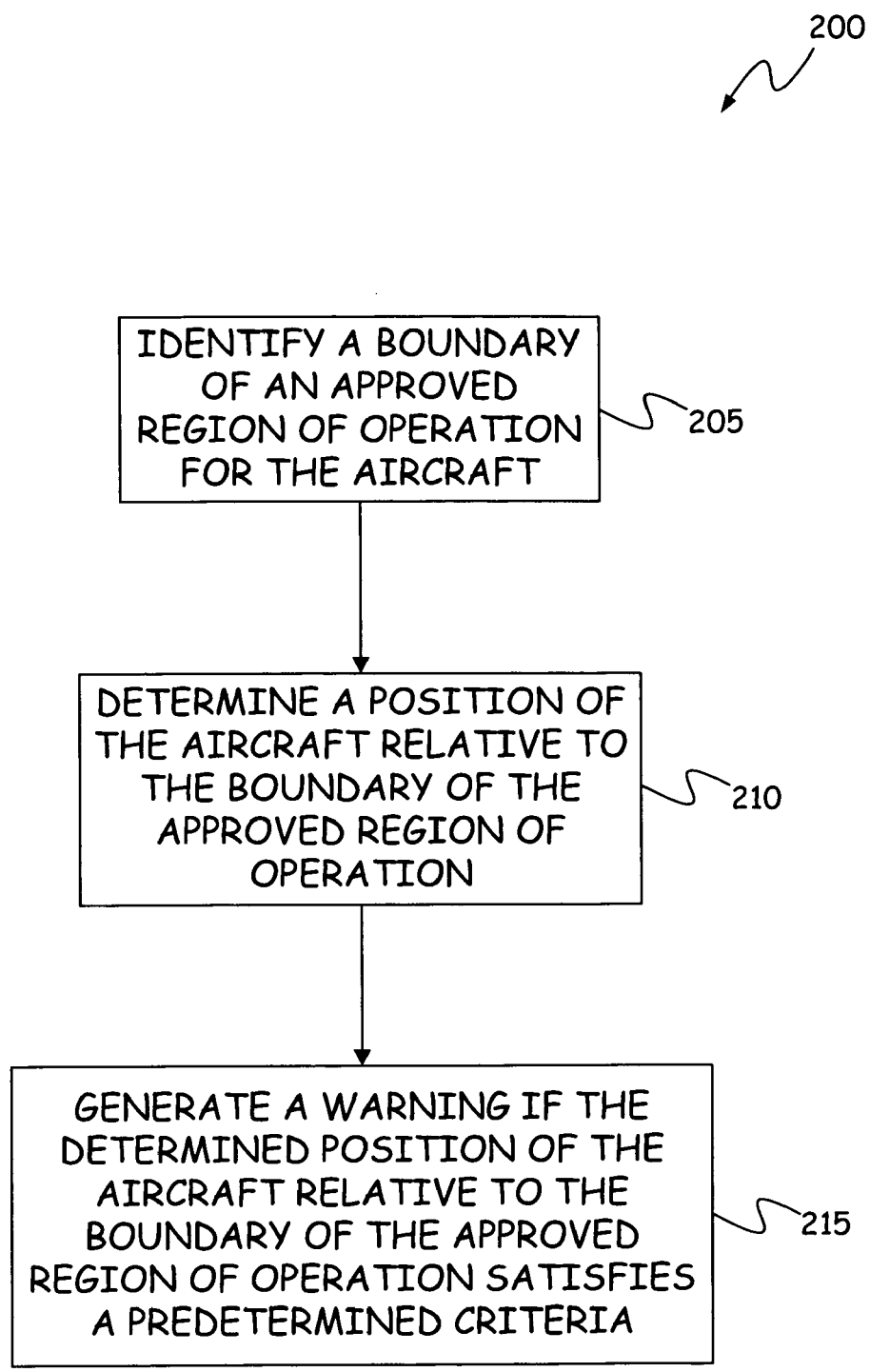
FIG. 2 is a flow diagram illustrating a method of warning a pilot to prevent navigation of an aircraft into an approved region of operation in accordance with disclosed embodiments.

Referring now to FIG. 2, shown is a flow diagram 200 illustrating disclosed method embodiments which can be implemented by system 100 or other terrain awareness or navigation warning systems. The disclosed methods of warning a pilot are useful in preventing navigation of an aircraft into an unapproved region of operation as described above. As illustrated at block 205 in FIG. 2, the methods include the step of identifying the boundary of an approved region of operation for the aircraft. As described above, this step can be based on safety consideration such that the approved region of operation is a predetermined safe region of operation in some embodiments. In exemplary embodiments, the boundary is between the approved region of operation and an unapproved region of operation. In terrain awareness applications, unsafe regions of operation can be positioned in the unapproved region of operation, but apart from the boundary, thereby providing additional warning opportunities as described above. The unsafe regions of operation can in turn contain terrain hazards positioned in the unsafe region such that operating the aircraft in the approved region of operation prevents collision of the aircraft with the terrain hazards.

As represented in block 210 of FIG. 2, after identifying the boundary of the approved region of operation, exemplary embodiments of the disclosed methods include the step of determining a position of the aircraft relative to the boundary. As described with reference to the system of FIG. 1, this step can include obtaining position and heading information from other avionics systems, for example global positioning systems (GPS), inertial navigation systems (INS), etc. Finally, as illustrated at block 215, the exemplary methods include the step of generating a warning if the determined position of the aircraft relative to the boundary of the approved region of operation satisfies a predetermined criteria. Examples of these predetermined criteria were described above.

Figure 3:
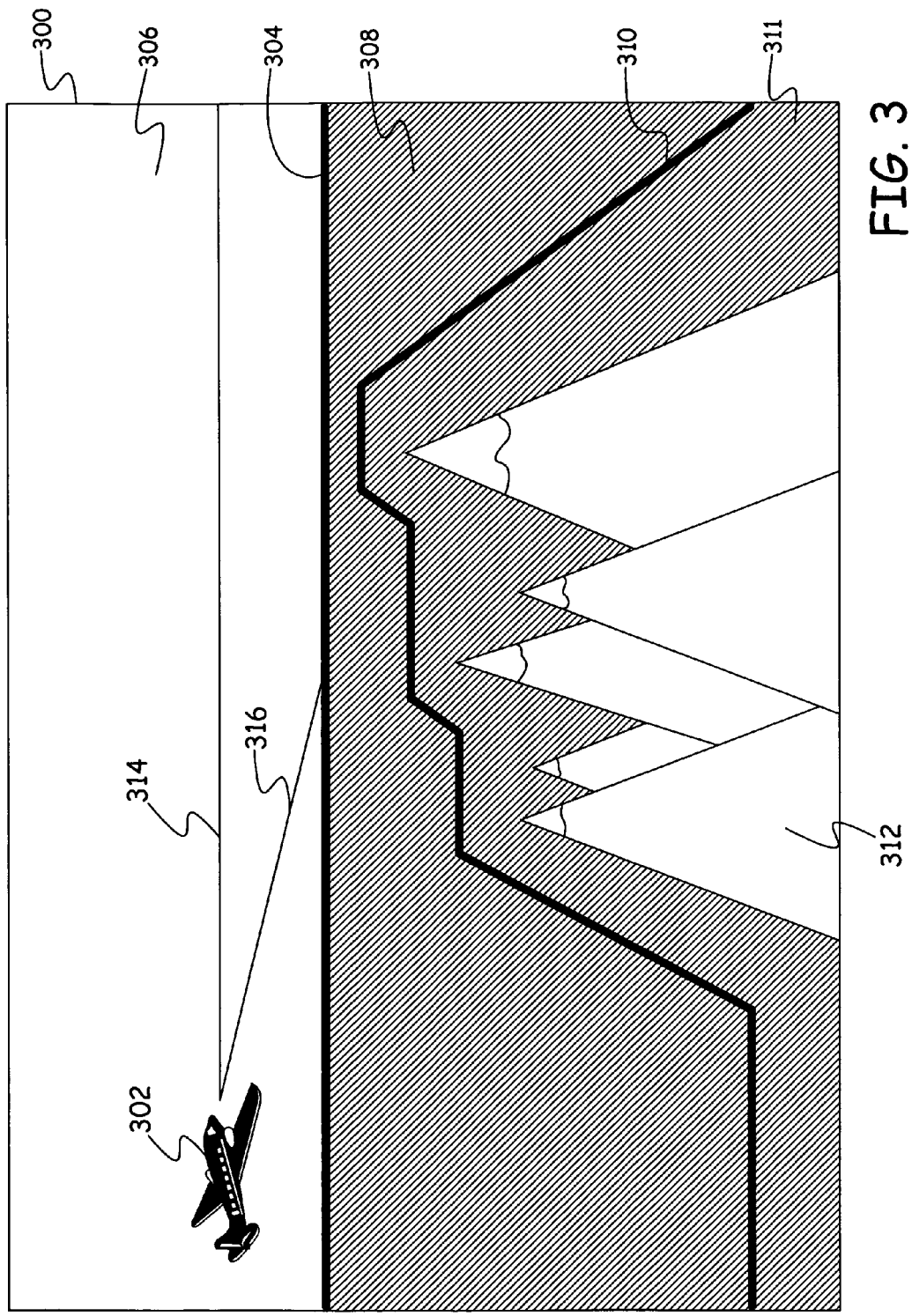
FIGS. 3-7 are diagrammatic illustrations of graphical representations of an aircraft relative to a boundary of an approved region of operation.

Referring now to FIG. 3, shown is a diagrammatic illustration of a display screen 300 which can be displayed on a display device such as display device 142 shown in FIG. 1. Display screen 300 illustrates a position of aircraft 302 relative to a boundary 304 of an approved region of operation 306 for the aircraft. The approved region of operation 306, and therefore boundary 304, can be determined using the algorithms as described above, or using other algorithms.

As can be seen in FIG. 3, boundary 304 is a graphical representation or designation of the boundary between approved region of operation 306 and unapproved region of operation 308. In this particular example embodiment, an unsafe region of operation 311 (illustrated as being bordered by boundary 310) is positioned within unapproved region of operation 308. This unsafe region of operation 311 includes one or more terrain or obstacle hazards. In this particular instance, the terrain or obstacle hazards can include both mountains 312 and the ground. These are merely examples, and other terrain and obstacles could also be included within the unsafe region.

By establishing boundary 304 between the approved region of operation 306 and the unapproved region of operation 308, the pilot of the aircraft can be assured that operating the aircraft in approved region of operation 306 will prevent a collision of the aircraft with obstacles or terrain hazards (such as mountains 312) within the unsafe region of operation 311. Since boundary 304 between the approved and unapproved regions of operation is spaced apart from boundary 310 of unsafe region 311, it is not necessary in all embodiments that a terrain map database be included in the system for purposes of identifying boundary 310 of unsafe region 311. In other words, by maintaining operation within approved region of operation 306, it can be unnecessary to specifically identify boundary 310 of unsafe region 311. In conventional systems, an aircraft might follow boundary 310 to avoid CFIT situations, and thus such a terrain map was frequently necessary. Boundary 310 and unsafe region 311 are illustrated in FIG. 3 merely for purposes of emphasizing this fact.

In some embodiments, warning generation component 120 illustrated in FIG. 1 issues a warning only if the position and/or heading of aircraft 302 indicates that the aircraft has or will cross boundary 304. For example, in FIG. 3, line 314 represents one possible heading of aircraft 302 which is not predicted to cross boundary 304. If this is the predicted heading of aircraft 302, then warning generation component 120 would not need to generate any additional warnings beyond the graphical representation of boundary 304 relative to a position of aircraft 302. However, if a heading such as the one depicted by line 316 in FIG. 3 is predicted, such that the aircraft will cross boundary 304 and leave approved region of operation 306, then warning generation component 120 would generate additional visual and/or audible warnings.

FIGS. 4-7 are other diagrammatic illustrations of display screens which can be displayed on a display device such as display 142 shown in FIG. 1. These diagrammatic illustrations of displays screens represent other examples of configurations of boundaries between approved regions of operation and unapproved regions of operations.

Figure 4:
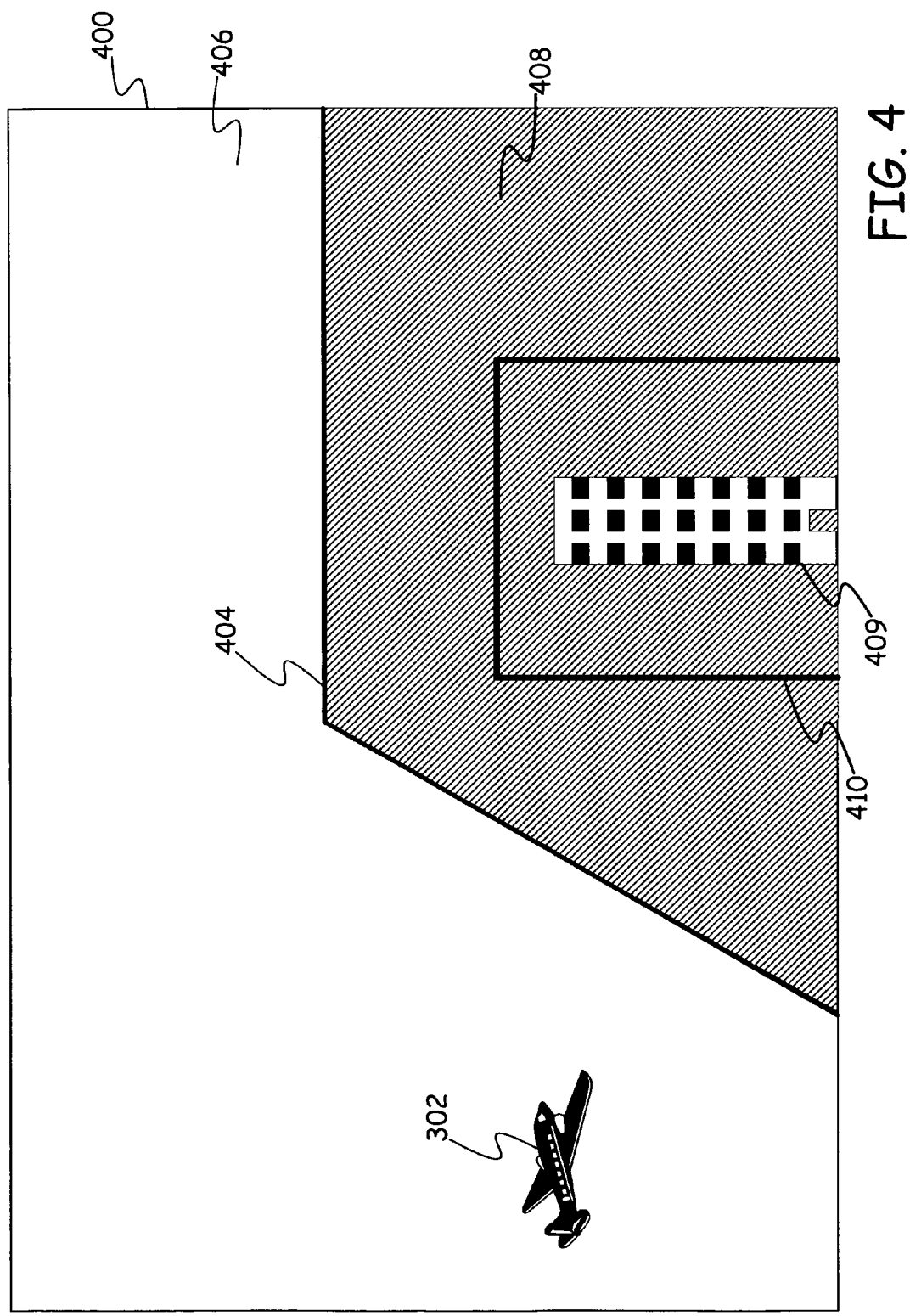

Referring now to FIG. 4, shown is a display screen 400 illustrating boundary 404 between approved region of operation 406 and unapproved region of operation 408 in another exemplary embodiment. This display screen can represent, for example, the boundary conditions in flight phases such as takeoff or other flight phases in which a climb to a predetermined minimum altitude is desired or required. Shown in unapproved region of operation 408 is an obstacle hazard 409, in the form of a building, positioned in an unsafe region 410. Unsafe region 410 is spaced apart from boundary 404 such that operation of aircraft 302 in region 406 prevents collision with the obstacle hazard.

Figure 5:
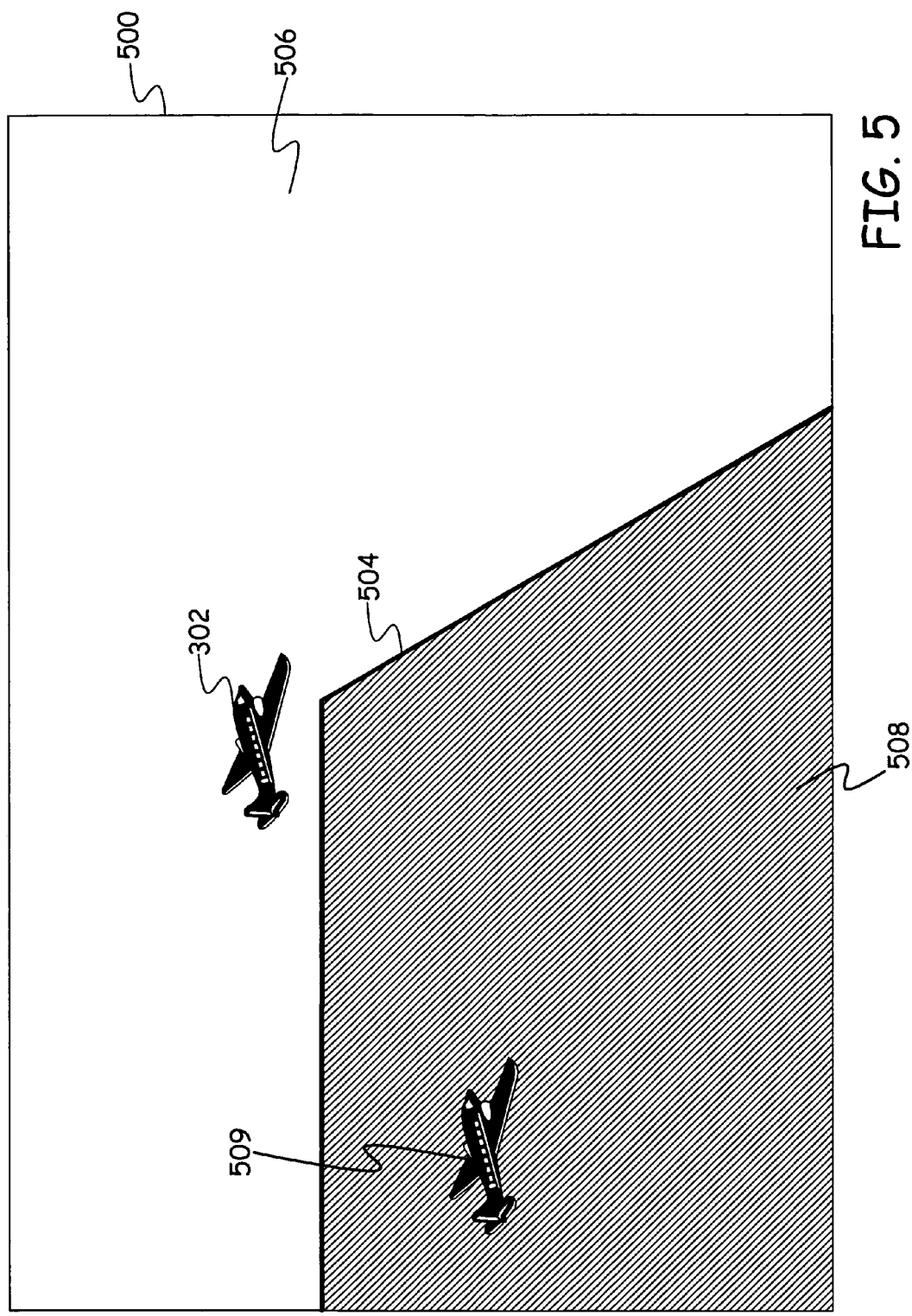

Referring now to FIG. 5, shown is display screen 500 illustrating boundary 504 between approved region of operation 506 and unapproved region of operation 508. This display screen provides a diagrammatic illustration of another boundary configuration for flight phases such as landing or other flight phases in which a descent is allowed after a particular aircraft position is achieved. Also shown in FIG. 5 is an obstacle hazard in the form of a second aircraft or airborne vehicle 509. Airborne vehicle 509 is shown operating in the region 508 which is unapproved for aircraft 302. In some embodiments, unapproved region of operation 508 for an aircraft 302 is defined to encompass airspace in use by other airborne vehicles. Thus, midair collisions between aircraft can be avoided using system 100.

Figure 6:
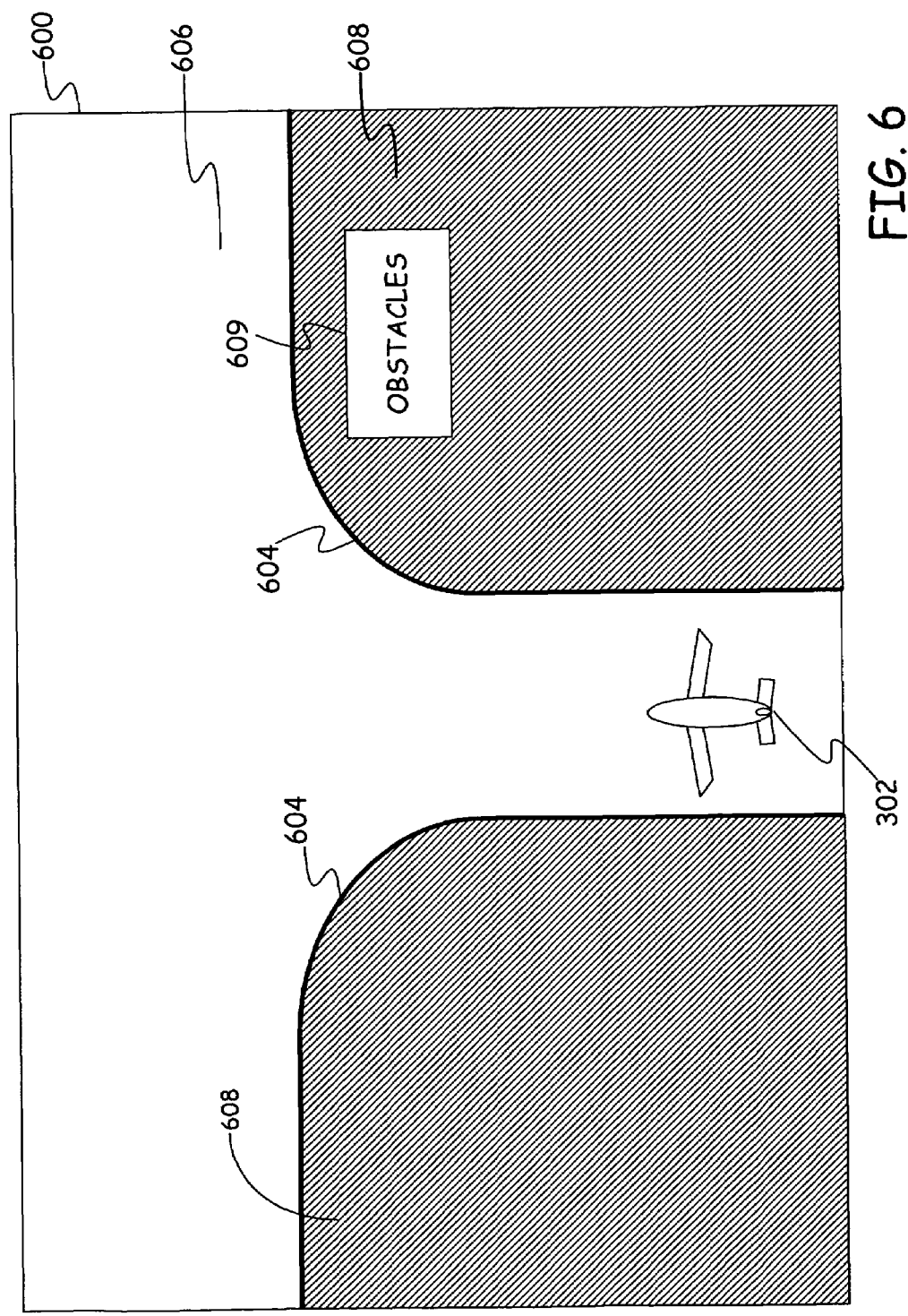
Figure 7:
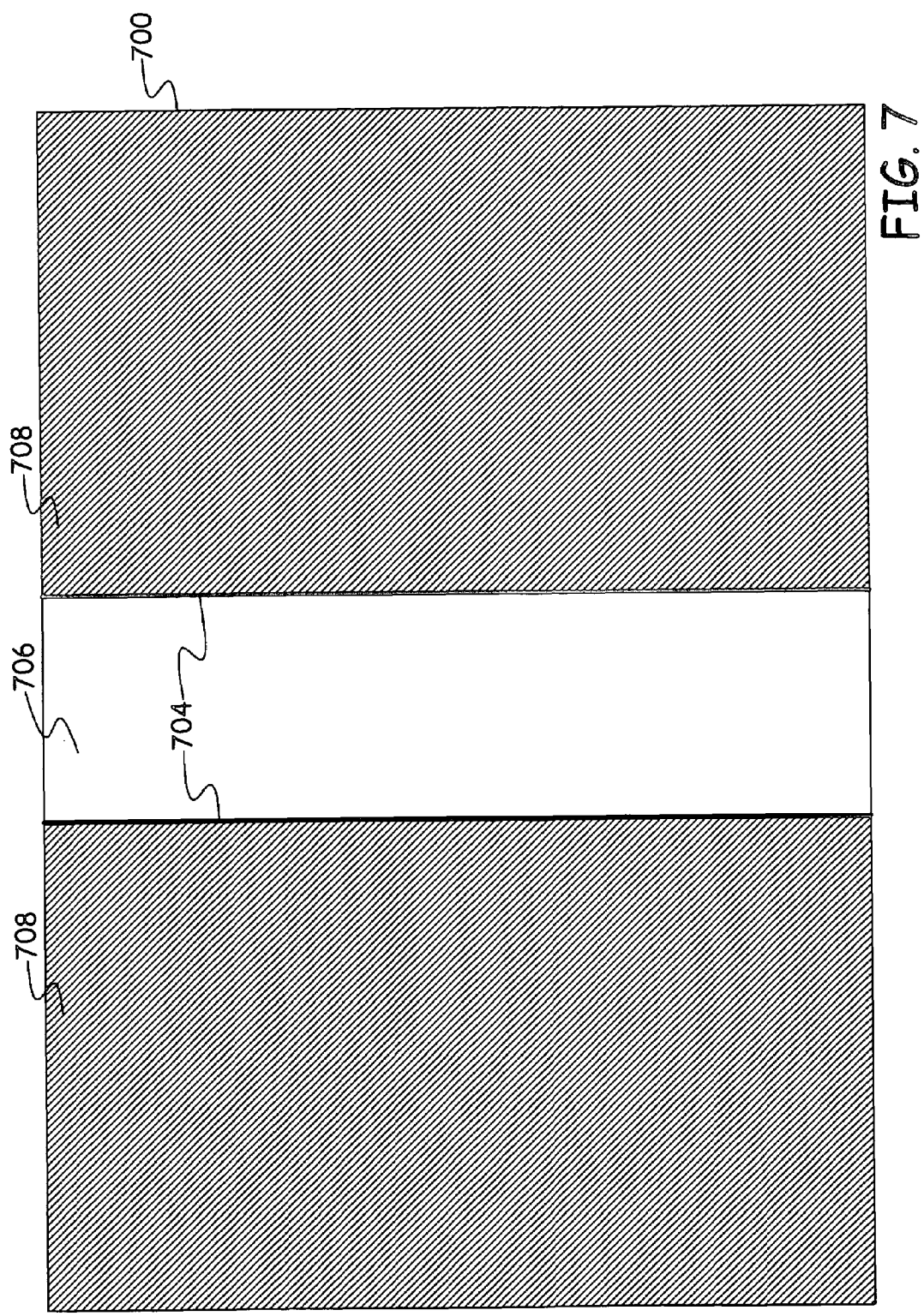

FIGS. 6 and 7 diagrammatically illustrate display screens 600 and 700, respectively, which represent boundary conditions of approved regions of operation for on-ground areas in proximity of an airport. For example, in the top or downward looking view provided by display screen 600, boundary 604 between approved regions of operation 606 and unapproved regions of operation 608 can represent a lateral boundary between approved taxiways, runways, etc. and unapproved or off limit airport areas. Display screen 700 illustrated in FIG. 7 represents a forward looking view of the same scenario shown in FIG. 6 (aircraft 302 is not depicted in FIG. 7). In other words, approved region of operation 706 corresponds to approved region of operation 606 shown in FIG. 6, while unapproved regions 708 correspond to unapproved regions 608. In this respect, boundaries 704 represented as vertically extending walls through which the aircraft should not pass while on the ground in the airport area. In FIG. 6, an obstacle hazard 609 is illustrated in unapproved region of operation 608. Obstacle 609 can represent any on-ground obstacle hazard, for example including buildings, ground vehicles, temporary hazards such as mobile construction equipment, snowplows, etc. Operation of aircraft 302 within approved region of operation 606 reduces the chances of a collision with any such obstacles.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of warning a pilot to prevent navigation of an aircraft into an unapproved region of operation, the method comprising:

identifying a boundary of an approved region of operation for the aircraft based upon safety considerations such that the approved region of operation is a predetermined safe region of operation, the boundary of the approved region of operation being a boundary between the approved region of operation and an unapproved region of operation, and at least one unsafe region of operation being positioned in the unapproved region of operation, but spaced apart from the boundary of the approved region of operation;

displaying on a display device a graphical designation of the boundary of the approved region of operation;

determining a position of the aircraft relative to the boundary of the approved region of operation; and generating a warning, before a threat corresponding to the at least one unsafe region of operation is detected, if the determined position of the aircraft relative to the boundary of the approved region of operation is predictive of the aircraft departing the approved region of operation.

2. The method of claim 1, wherein the at least one unsafe region of operation has at least one of a terrain hazard and an obstacle hazard positioned within the unsafe region, such that operating the aircraft in the approved region of operation prevents collision of the aircraft with the at least one of the terrain hazard and the obstacle hazard.

3. The method of claim 1, wherein the boundary of the approved region of operation is defined using one of a plurality of algorithms which are selected based upon at least one of flight phase and operator procedure.

4. The method of claim 3, wherein for an en route flight phase, the selected one of the plurality of algorithms defines the boundary of the approved region of operation based upon a minimum clearance altitude defined for a particular route or geographic region.

5. The method of claim 3, wherein for a terminal area flight phase, the selected one of the plurality of algorithms defines the boundary of the approved region of operation based upon at least one of a published minimum descent sector, a published approach/departure route minima, and Terminal Instrument Procedures (TERPS).

6. The method of claim 1, wherein the approved region of operation include on ground areas in proximity of an airport which are approved for aircraft movement.

7. The method of claim 1, wherein the approved region of operation includes a laterally extending region around a path between a departure airport and a destination airport.

8. An navigation warning system for preventing navigation of an aircraft into an unapproved region of operation, the navigation warning system comprising:

a boundary identification component configured to identify a boundary of an approved region of operation for the aircraft, wherein the boundary identification component is configured to identify the boundary of the approved region of operation for the aircraft based upon safety considerations such that the approved region of operation is a predetermined safe region of operation wherein the boundary is between the approved region of operation and an unapproved region of operation, and wherein at least one unsafe region of operation is positioned in the unapproved region of operation, but apart from the boundary; and a warning generating component configured to warn a pilot of the aircraft, before a threat corresponding to the at least one unsafe region of operation is detected, if at least one of a position and a heading of the aircraft satisfy a predetermined criteria relative to the boundary of the approved region of operation such that it is predicted that the aircraft is going to depart from the approved region of operation.

9. The navigation system of claim 8, wherein at least one obstacle hazard is positioned in the unsafe region such that operation of the aircraft in the approved region of operation prevents collision with the at least one obstacle hazard, the at least one obstacle hazard including at least one of another airborne vehicle, a ground vehicle, a temporary hazard, and a building.

10. The navigation warning system of claim 8, wherein the boundary identification component is configured to identify the boundary of the approved region of operation using one of a plurality of algorithms which are selected based upon at least one of flight phase and operator procedure.

11. The navigation warning system of claim 10, wherein the plurality of algorithms define the boundary of the approved region of operation based upon at least one of a minimum clearance altitude for a particular route or geographic region, a published minimum descent sector, a published approach/departure route minima, and Terminal Instrument Procedures (TERPS).

12. The navigation warning system of claim 8, and further comprising a display device configured to display a graphical designation of the boundary of the approved region of operation.

13. The navigation warning system of claim 12, wherein the approved region of operation include on ground areas in proximity of an airport which are approved for aircraft movement.

14. An navigation warning system for preventing navigation of an aircraft into an unapproved region of operation, the navigation warning system comprising:

a boundary identification component configured to identify a boundary of an approved region of operation for the aircraft, the approved region of operation including on ground areas in proximity of an airport which are approved for aircraft movement, wherein the boundary is between the approved region of operation and an unapproved region of operation, and wherein at least one unsafe region of operation is positioned in the unapproved region of operation, but apart from the boundary;

a display device configured to display a graphical designation of the boundary of the approved region of operation; and a warning generating component configured to warn a pilot of the aircraft, before a threat corresponding to the at least one unsafe region of operation is detected, if at least one of a position and a heading of the aircraft satisfy a predetermined criteria relative to the boundary of the approved region of operation such that it is predicted that the aircraft is going to depart from the approved region of operation.

\* \* \* \* \*